United States Patent [19]

Theus

[11] Patent Number: 4,825,404
[45] Date of Patent: Apr. 25, 1989

[54] INTERFACE SYSTEM WHICH GENERATES CONFIGURATION CONTROL SIGNAL AND DUPLEX CONTROL SIGNAL FOR AUTOMATICALLY DETERMINING THE CONFIGURATION OF REMOVABLE MODULES

[75] Inventor: John G. Theus, Portland, Oreg.

[73] Assignee: Tektronix, Inc., Beaverton, Oreg.

[21] Appl. No.: 802,567

[22] Filed: Nov. 27, 1985

[51] Int. Cl.[4] .................. G06F 3/00; G06F 13/00; G06F 15/16

[52] U.S. Cl. .................... 364/900; 340/825

[58] Field of Search ... 364/200 MS File, 900 MS File; 340/825

[56] References Cited

U.S. PATENT DOCUMENTS

| | | | |
|---|---|---|---|
| 3,581,286 | 5/1971 | Beausoleil | 364/200 |
| 4,195,344 | 3/1980 | Yamazaki | 364/200 |
| 4,366,535 | 12/1982 | Cedolin et al. | 364/200 |
| 4,556,953 | 12/1985 | Caprio et al. | 364/900 |
| 4,562,535 | 12/1985 | Vincent et al. | 364/200 |
| 4,571,676 | 2/1986 | Mantellina et al. | 364/200 |
| 4,589,063 | 5/1986 | Shah et al. | 364/200 |

Primary Examiner—Archie E. Williams, Jr.
Assistant Examiner—Ayni Mohamed
Attorney, Agent, or Firm—John P. Dellett; Robert S. Hulse

[57] ABSTRACT

An interface circuit in a modular electronic system includes duplex control-signal transmission lines. Modules connectable to a controller unit of the system transmit configuration data items by way of the duplex lines to the controller during a first time period, and the controller during a second time period generates module control signals in accordance with the configuration of the modules. The module control signals are transmitted to the modules on the duplex transmission lines.

16 Claims, 2 Drawing Sheets

INTERFACE SYSTEM WHICH GENERATES CONFIGURATION CONTROL SIGNAL AND DUPLEX CONTROL SIGNAL FOR AUTOMATICALLY DETERMINING THE CONFIGURATION OF REMOVABLE MODULES

BACKGROUND OF THE INVENTION

This invention relates to modular electronic systems, and more particularly to an interface circuit facilitating automatic determination of module presence and configuration.

As technology advances in the fields of data store, integrated circuits, circuit packaging and interconnection, available modules tend to change in size and storage capacity. For example, a new module of given size may be provided with increased data-store capacity, or a new version of a module storing a fixed amount of data may become smaller in physical size.

In the past, new-technology modules such as data-stored modules were often incompatible with existing equipment. Replacement of defective modules in existing equipment with new-technology modules was often impractical or impossible because of the need to change either the arrangement of interface signal connections, or the mounting hardware, to accommodate the new module.

Accordingly, it is an object of the invention to provide, in a modular electronic system, an improved interface between the system and modules connectable to the system.

It is another object of the invention to provide an improved dual-function interface-signal circuit.

Another object of the invention is to provide improved apparatus for automatically determining the size and configuration of connectable modules such as data-store modules in a modular electronic system.

SUMMARY OF THE INVENTION

The present invention provides a universal module interface circuit wherein a control unit of a central system communicates interactively via one or more control signal interface leads with a connectable module of the system to determine the configuration of the module, and generates module control signals corresponding with the configuration determined. The module includes a control signal generating element that impresses on the interface lead a signal representing a physical configuration such as data-store size of the module. The control signal interface leads are conventionally used for transmitting control signals from the control unit to the module; however, to determine module configuration, the control unit disables normal generation a control signal on an interface lead, and enables reading of the module configuration signal on that lead. The control unit stores and subsequently utilizes the module configuration signal to generate a module central signal that is impressed on the interface lead for transmission to the module.

BRIEF DESCRIPTION OF THE DRAWINGS

While the invention is set forth with particularity in the appended claims, other objects, features, the organization and method of operation of the invention will become more apparent and the invention will best be understood by referring to the following detailed description in conjunction with the accompanying drawings in which:

DESCRIPTION OF THE PREFERRED EMBODIMENT

Figure 1:
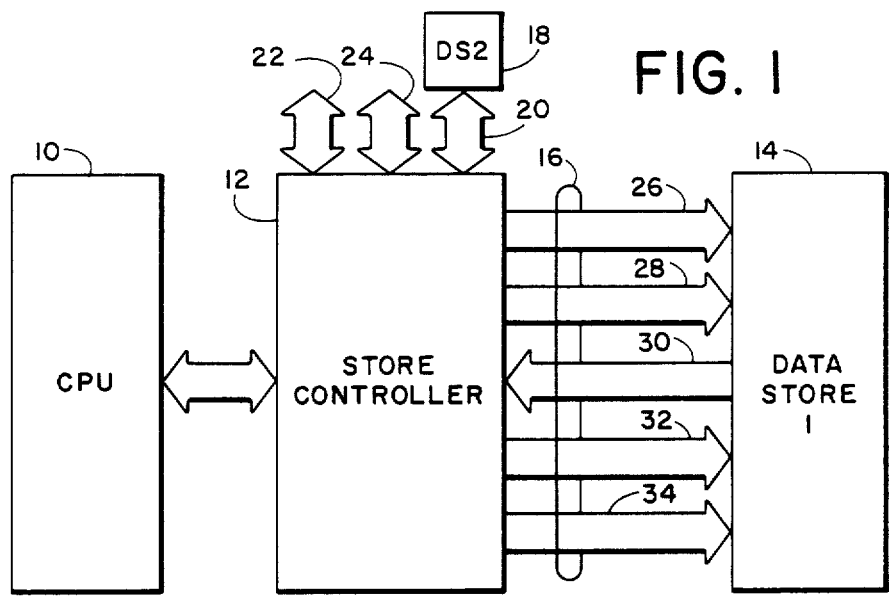
FIG. 1 is a block diagram of a module electronic system in which the present invention is utilized.

Referring now to the drawings for a more detailed description of the construction, operation and other features of the instant invention by characters of reference, FIG. 1 shows a modular computer system comprising a central processing unit (CPU) 10, a store controller 12 and a data store module 14. The data store module 14 is connected to the store controller 12 by way in interface or input/output port 16. A second data store module 18 is connected to the store controller 12 by another port 20 while additional data store modules (not shown) may be connected to vacant interface ports 22, 24 of the store controller 12.

The interface ports 16, 20, 22, 24 are each comprised of a plurality of signal leads or buses that form an interface between the store controller 12 and the data store modules connected in the system. The interface 16 typically includes a multiplexed address bus 26, a data-in bus 28, a data-out bus 30, a timing signal bus 32, and a module and bank select bus 34. The functions of the various interface buses and lines are conventional and well known in the art.

The data store of FIG. 1 represents the main internal store of the computer system of the presently described embodiment of the invention. Such data store may be made from either semiconductor devices or magnetic core modules having cycle times ranging from 20 to 2000 nanoseconds. Data store is divided logically into separately addressable groups termed herein "fields", and physically divided into groups called "banks". A logically addressable field of data store may be physically located in more tha one data store bank. A "module" means a physical arrangement of one or more banks of data store on a connectable assembly, alternatively called a "card" or a "board". Modular arrangement of the data store may facilitate internal time-saving operations of the system such as overlapping and interleaving of the data store. In the presently described embodiment of the invention, sufficient address lines are provided in the interface to address modules having one megabit of data store. In addition to address lines, four bank select signals, e.g. CAS0–CAS3, and two module select signals, e.g. CARD0, CARD1, may be provided on buses such as bus 34. Each of the modules 14, 18 suitably includes four banks of data store, each bank having 0.25 million words. The system of FIG. 1, utilizing the two modules 14, 18, is thus capable of addressing two million words of data store. If the modules 14, 18 were each capable of holding, say, only two banks of data store because of physical size limitations imposed by bit density of the particular technology employed to manufacture the data store modules, then four modules would be required to achieve the same two million word data store capacity. The store controller 12 according to the present invention senses the presence of and determines the size and configuration of each data store module connected in the system.

Figure 2:
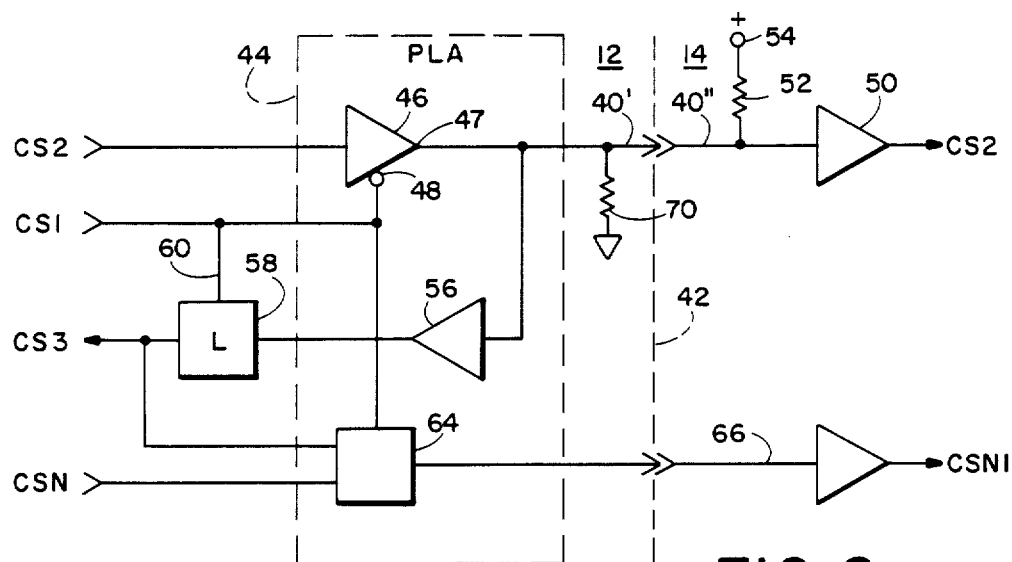
FIG. 2 is a schematic block diagram of one embodiment of the instant invention.

Referring to FIG. 2, an interface circuit in accordance with the present invention includes a typical module interface lead 40 having a first portion 40' thereof in the store controller 12 and a second portion 40" in the data store module 14, the line 40 being connected at an interface connector represented by a dashed line 42. A programmable logic array (PLA) 44 receives a control signal CS2, which may be a data store address signal or other control signal, for transmission from the store controller to the data store module 14. A tri-state logic element or gate 46 of the logic array 44 receives the CS2 control signal and regenerates it at an output node 47 under control of another control signal CS1. The CS1 control signal is in a first logic state during a first time period, and in a second logic state during a second time period. During the second time period, the tri-state gate 46 is selected or rendered active by the CS1 control signal on input connection 48, and the gate 46 will transfer a logical 0 or logical 1 state of the CS2 signal to the output node 47 which is connected to the interface lead 40'. The data store module 14 then receives the CS2 control signal by way of a gate 50 connected to the interface lead 40". During the first time period, the CS1 signal disables the tri-state gate 46, and the tri-state output appears as an open circuit of very high impedance at the output node 47. Information in the form of a plurality of discrete data items representing the configuration of the data store module 14, e.g., the size of the data store, the number of data store banks on the module, etc., can be communicated at such time to the store controller 12 via the control signal interface leads such as lead 40. For instance, a resistor 52 connected in the module 14 from the interface lead 40" to a positive power source 54 can generate a logic 1 data item on the interface lead 40" while absence of the resistor 52 can generate a logic 0 on the lead 40".

A logic gate 56 of the PLA 44 is connected to the interface lead 40', and regenerates the data item received from the module 14 as a configuration control signal CS3. A latch circuit 58, which may be for example an RS bistable, stores the CS3 control signal in response to the first logic state of the CS1 control signal connected via lead 60 to an enabling input of the latch circuit 58.

A logic element 64 of PLA 44 is also enabled by the CS1 control signal during the second time period to provide a regenerated control signal CSN1 for operating the data store module 14. The CSN1 control signal, which may, for example, be a module select or a bank select signal, is transmitted to the data store module 14 on interface lead 66. The CSN1 control signal is suitably a logical combination of control signal CSN generated in the store controller and configuration control signal CS3 from the module 14.

A pull down resistor 70 serves to generate a logic 0 on the interface lead 40' when the resistor 52 is not connected in the module 14, or when hte data store module 14 is removed from the system. Means are thus provided which can be used for detecting physical presence of a module connected to the interface connector 42.

Figure 3:
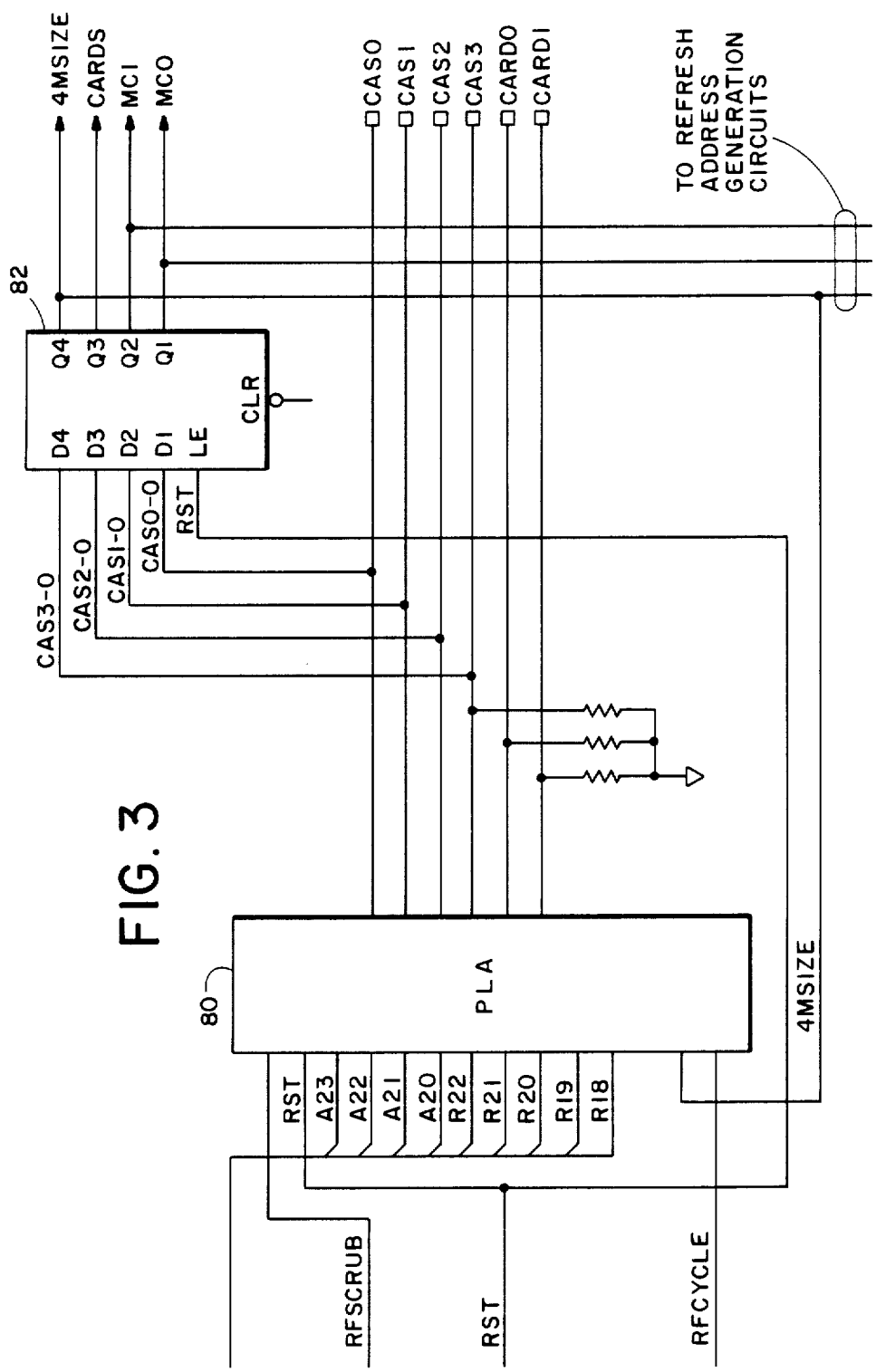
FIG. 3 is a schematic diagram and a circuit in accordance with the invention.

Referring the FIG. 3, a detailed illustrative embodiment of the present invention includes a programmed logic array 80 receiving address signals R18-R22, A2-0-A23; and control signals RST, RFCYCLE and RFSCRUB from the store controller, and configuration control signals CARD0, CARD1, and 4MSIZE from the data store module. The address signals A20-A23 represent data store address bits for normal data store access while the R18-R22 address signals represent data store address bits for address generation during a data refresh cycle. The RFCYCLE and RFSCRUB signals are utilized for refresh address generation. The RST signal is a configuration control signal generated in the store controller, and corresponds to the CS1 control signal of FIG. 2. The CARD0 and CARD1 signals are module-select control signals generated by the PLA 80 during the second time period of the configuration control signal (/RST), while the signals CARD0 and CARD1 also represent configuration data items input to the PLA 80 from the data store module during the first time period of the configuration control signal (RST). Bank select signals CAS0-CAS3 are logically derived in the PLA 80 from the input address and control signals as shown below in logic equations. The CAS-0-CAS3 bank select signals are stored in latch circuit 82 (corresponding to latch 58 in FIG. 2), respectively as card count signals MC0 and MC1, card present signal CARDS, and data store size signal 4MSIZE. The PLA 80 generates the data store control signals in accordance with logic equations programmed into the PLA. The logic structure of the output signals is disclosed below in the form of Boolean logic equations. In the equations, a "+" symbol or logic operator denotes an OR function, and a "*" symbol indicates an AND function. A "/" symbol prefix of a logic name means that the signal is the complement of the named signal (positive logic is utilized), i.e., "/" means that the voltage level associated with the term is the less positive level, and the term is enabled or high when that level is present on the signal node. For example, the CAS0 signal is enabled when the /CAS0 signal node is at the less positive level, and disabled when the /CAS0 node is at the more positive level. A logic term without a suffix symbol indicates that the voltage level associated with the term is the more positive level and the term is enabled or high when that level is present on the signal node. An "If" logic operator precedes a tri-state gate control signal such as the signal RST. The PLA 80 of the present invention is a Model 20L8A prgrommable array logic circuit manufactured by Monolithic Memories Inc.

```
If /RST /CARD0 = (/RFCYCLE * /4MSIZE * /A21 * /A20 * /A23)
              + (/RFCYCLE * /4MSIZE * /A21 * /A20 * /A22)
              + (/RFCYCLE * 4MSIZE * /A22)
              + (RFCYCLE * RFSCRUB * /4MSIZE * /R21 * /R20)
              + (RFCYCLE * RFSCRUB * 4MSIZE * /R22)
If /RST /CARD1 = (/RFCYCLE * /4MSIZE * /A21 * A20 * /A23)
              + (/RFCYCLE * /4MSIZE * /A21 * A20 * /A22)
              + (/RFCYCLE * 4MSIZE * A22 * /A23)
              + (RFCYCLE * RFSCRUB * /4MSIZE * /R21 * R20)
              + (RFCYCLE * RFSCRUB * 4MSIZE * R22)
       /CAS0 = (/RST * /RFCYCLE * /A23)
              + (/RST * /RFCYCLE * /A22)
```

```
            + (/RST * RFCYCLE * /4MSIZE * /R19 * /R18)
            + (/RST * RFCYCLE * 4MSIZE * /R21 * /R20)
            + (RST * /CARD1)
    /CAS1 = (/RST * /RFCYCLE * /A23)
            + (/RST * /RFCYCLE * /A22)
            + (/RST * RFCYCLE * /4MSIZE * /R19 * R18)
            + (/RST * RFCYCLE * 4MSIZE * /R21 * R20)
            + RST
    /CAS2 = (/RST * /RFCYCLE * /A23)
            + (/RST * /RFCYCLE * /A22)
            + (/RST * RFCYCLE * /4MSIZE * R19 * /R18)
            + (/RST * RFCYCLE * 4MSIZE * R21 * /R20)
            + (RST * /CARD0 * /CARD1)
If /RST /CAS3 = (/RST * /RFCYCLE * /A23)
            + (/RST * /RFCYCLE * /A22)
            + (/RST * RFCYCLE * /4MSIZE * R19 * R18)
            + (/RST * RFCYCLE * 4MSIZE * R21 * R20)
```

While the principles of the invention have now been made clear in the foregoing illustrative embodiment, there will be immediately obvious to those skilled in the art many modifications of structure, arrangement, proportions, the elements, materials and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

I claim:

1. In a modular electronic system having a control unit and a modular unit connected to the control unit, the modular unit receiving control signals form the control unit module interface circuit, comprising:

an interface lead transmitting control signals between the control unit and the modular unit;

means in the modular unit connected to the interface lead for generating a configuration control signal representing a system configuration of the modular unit;

means in the control unit connected to the interface lead for receiving the configuration control signal during a first time period;

means in the control unit having an output connected to the interface lead for generating a module control signal during a second time period, the module control signal being enabled on the interface lead during the second time period responsive to an enabled state of the configuration control signal amd disabled when the configuration control signal is a disabling signal;

means for generating a duplex control signal, the duplex control signal having a first state during the first time period and a second state during the second time period, the module contorl signal generating means including means responsive to the duplex control signal for decoupling the output of the module control signal generating means from the interface lead during the first time period, and means in the modular unit connected to the interface lead for receiving the module control signal when the configuration control signal is in an enabled state.

2. The universeal module interface of claim 1, further comprising:

means in the control unit responsive to said duplex control signal for storing said configuration control signal during said first time period.

3. In a modular electronic system having removable modules, an interface circuit, comprising:

a duplex control signal lead transmitting signals between a first module and a second module of said system, said duplex control signal lead having a first portion in the first module and a second portion in the second module, the first and second portions of said duplex control signal lead being connected at an interface of the modules;

means in the first module for generating a first control signal, the first control signal being enabled during a first time period and disabled during a second time period;

means in the first module for generating a second control signal;

logic means in the first module receiving the second control signal and having an output connected to the first portion of said duplex control signal lead and responsive to the first control signal for regenerating the second control signal on said duplex control control lead during the second time period, the output of said means for regenerating the second control signal being disabled from said duplex control signal lead by the first control signal during the first time period;

means in the secnod module connected to the second portion of said duplex control signal lead for receiving the second control signal regenerated;

means connected to said duplex control signal lead for generating a third control signal on said duplex control signal lead, the third control signal representing a physical configuration of said system, said logic means including means connected to the first portion of said duplex control signal lead and responsive to the first control signal during the first time period for storing the third control signal; and means in said first module for utilizing the stored third control signal.

4. The interface circuit of claim 3, wherein the third control signal represents physical presence of the second module, the third control signal being an enabling signal when the second module is connected to the system at the interface and a disabling signal when the second module is disconnected from the system.

5. The interface circuit of claim 4, wherein said means for generating the third control signal comprises means for generating the disabling signal on the first portion of said duplex control signal lead.

6. The interface circuit of claim 5, wherein said means for regenerating the second control signal comprises a tri-state driver circuit having an output terminal connected to said duplex control signal lead; and said means for generating the third control signal comprises a pull-down resistor connected to the output terminal.

7. The interface circuit of claim 4, wherein said means for generating the third control signal comprises means in the second module for generating the enabling signal on the second portion of said duplex control signal lead.

8. The interface circuit of claim 7, wherein said means for generating the enabling signal comprises a pull-up resistor connected to the second portion of said duplex control signal lead.

9. The interface circuit of claim 3, wherein the second module comprises a data store and the third control signal represents a first size of the data store when the third control signal is enabled and a second size of the data store when the third control signal is disabled.

10. The interface circuit of claim 9, wherein said means for generating the third control signal comprises logic means in the second module connected to the second portion of said duplex control signal lead for enabling and disabling the third control signal.

11. The interface circuit of claim 9, wherein said means for generating the third control signal comprises means in the second module for generating an enabling signal on the second portion of said duplex control signal lead.

12. The interface circuit of claim 11, wherein said means for generating the enabling signal comprises a pull-up resistor connected to the second portion of said duplex control signal lead.

13. The interface circuit of claim 3, further comprising:
   means in said logic means responsive to the third control signal for generating another control signal; and
   means in the second module for utilizing the other control signal.

14. The interface circuit of claim 3, further comprising:
   means in said logic means responsive to the third control signal for generating another control signal during the second time period;
   a third module connected to the first module; and
   means in said third module for utilizing the other control signal.

15. The interface circuit of claim 3, wherein said means for generating the third control signal comprises a pull-down resistor connected to the first portion of said duplex control signal lead.

16. In a data processing system having a system controler and a data store including one or more removable data store modules connected in the system through said controller, said data store receiving data store control signals from said system controller, means for determining the configuration of the data store, comprising:
   a duplex control signal transmission line connected between said system controller and a data store module;
   a first control signal source in said system controller generating a system configuration control signal enabled during a first time period and disabled during a second time period;
   a second control singal source in said system controller generating a data store control signal;
   a third control signal source connected to said duplex control signal transmission line and generating a third control signal representing configuration of the data store module;
   a control logic unit in said system controller including a tri-state logic element receiving said data store control signal and having an output connected to said control signal transmission line, said tri-state logic element being responsive to said configuration control signal to decouple the output from said control signal transmission line during the first time period, and a first logic element having an input connected to said duplex control signal transmission line and an output regenerating the third control signal during the first time period; and
   a storage element in said system controller receiving the output of said first logic element, and being responsive to the system configuration control signal to store the regenerated third control signal, said control logic unit including a second logic element responsive to an output of said storage element to generate another data store control signal.

* * * * *